United States Patent
Lee et al.

(10) Patent No.: US 9,887,593 B2
(45) Date of Patent: Feb. 6, 2018

(54) NON-CONTACT TYPE POWER TRANSMITTING APPARATUS, NON-CONTACT TYPE POWER RECEIVING APPARATUS, AND NON-CONTACT TYPE POWER TRANSCEIVING APPARATUS

(71) Applicant: SAMSUNG ELECTRO-MECHANICS CO., LTD., Suwon (KR)

(72) Inventors: Sung Uk Lee, Suwon (KR); Hee Sun Han, Suwon (KR); Ki Won Chang, Suwon (KR); Chul Gyun Park, Suwon (KR); Soon Tack Oh, Suwon (KR); Ji Hoon Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 463 days.

(21) Appl. No.: 14/607,170

(22) Filed: Jan. 28, 2015

(65) Prior Publication Data

US 2016/0126745 A1 May 5, 2016

(30) Foreign Application Priority Data

Nov. 3, 2014 (KR) ........................ 10-2014-0151164

(51) Int. Cl.
*H01F 27/42* (2006.01)
*H01F 37/00* (2006.01)
(Continued)

(52) U.S. Cl.
CPC .............. *H02J 50/80* (2016.02); *H02J 50/10* (2016.02)

(58) Field of Classification Search
CPC .. H02J 50/80; H02J 50/10; H02J 5/005; H02J 7/025; H02J 17/00; H04B 5/0037; H01F 38/14
(Continued)

(56) References Cited

U.S. PATENT DOCUMENTS

2004/0075494 A1 4/2004 Klomsdorf et al.
2013/0127405 A1 5/2013 Scherer et al.
(Continued)

FOREIGN PATENT DOCUMENTS

CN 102222967 A 10/2011
CN 102355032 A 2/2012
(Continued)

OTHER PUBLICATIONS

Chinese Office Action dated Dec. 18, 2017, in corresponding Chinese Application No. 201510080153.6 (11 pages in English, 8 pages in Chinese).

*Primary Examiner* — Carlos Amaya
(74) *Attorney, Agent, or Firm* — NSIP Law

(57) ABSTRACT

A non-contact type power transceiving apparatus may include: a non-contact type power transmitting apparatus adjusting bias power setting a level of transmission power based on a request and transmitting one of a first power and a second power having a power level higher than that of the first power in a non-contact scheme; and a non-contact type power receiving apparatus requesting one of the first power and the second power from the non-contact type power transmitting apparatus and varying a set temperature level determining an abnormal state based on the requested power.

5 Claims, 5 Drawing Sheets

(51) Int. Cl.
   *H01F 38/00* (2006.01)
   *H02J 50/80* (2016.01)
   *H02J 50/10* (2016.01)

(58) Field of Classification Search
   USPC .......................................................... 307/104
   See application file for complete search history.

(56) References Cited

U.S. PATENT DOCUMENTS

2014/0084856 A1    3/2014  Howard et al.
2016/0181849 A1*   6/2016  Govindaraj ............. H02J 7/025
                                                320/108

FOREIGN PATENT DOCUMENTS

| | | |
|---|---|---|
| CN | 102969751 A | 3/2013 |
| JP | 2013-31303 | 2/2013 |
| KR | 10-2013-0054897 | 5/2013 |
| KR | 10-2013-0096322 | 8/2013 |
| WO | WO 2009/111597 A2 | 9/2009 |

* cited by examiner

NON-CONTACT TYPE POWER TRANSMITTING APPARATUS, NON-CONTACT TYPE POWER RECEIVING APPARATUS, AND NON-CONTACT TYPE POWER TRANSCEIVING APPARATUS

CROSS-REFERENCE TO RELATED APPLICATION

This application claims the benefit of Korean Patent Application No. 10-2014-0151164 filed on Nov. 3, 2014, with the Korean Intellectual Property Office, the disclosure of which is incorporated herein by reference.

BACKGROUND

The present disclosure relates to a non-contact type power transmitting apparatus, a non-contact type power receiving apparatus, and a non-contact type power transceiving apparatus capable of transmitting, receiving or transceiving power in a non-contact scheme.

In order to externally supply power to an electronic device, a power supplying apparatus is required for transmitting power from an external power outlet to the electronic device.

In general, as the above-mentioned power supplying apparatus, a wired-type power supplying apparatus, directly connected to the electronic device through a connector, or the like, is mainly used to supply power to a battery embedded in the electronic device. Alternatively, as in the related art disclosed in the following Related Art Document, power may be supplied to the battery embedded in the electronic device in a non-contact scheme using a magnetic induction effect or a magnetic resonance effect.

Meanwhile, there may be an issue in which power consumption is increased due to a user demand for a larger screen, and the like, in mobile devices, such as smartphones, tablet personal computers (PCs), convertible laptop PCs, and the like. Accordingly, the battery capacity of the mobile device has gradually increased, and as a result, a charging time for charging batteries thereof may be increased due to increased battery capacity.

RELATED ART DOCUMENT

Korean Patent Laid-Open Publication No. 2013-0054897

SUMMARY

An aspect of the present disclosure may provide a non-contact type power transmitting apparatus, a non-contact type power receiving apparatus, and a non-contact type power transceiving apparatus capable of performing rapid charging.

According to an aspect of the present disclosure, a non-contact type power transceiving apparatus includes: a non-contact type power transmitting apparatus adjusting bias power setting a level of transmission power based on a request and transmitting one of a first power and a second power having a power level higher than that of the first power in a non-contact scheme; and a non-contact type power receiving apparatus requesting one of the first power and the second power from the non-contact type power transmitting apparatus and varying a set temperature level determining an abnormal state based on the requested power.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Exemplary embodiments in the present disclosure will now be described in detail with reference to the accompanying drawings.

Figure 1:
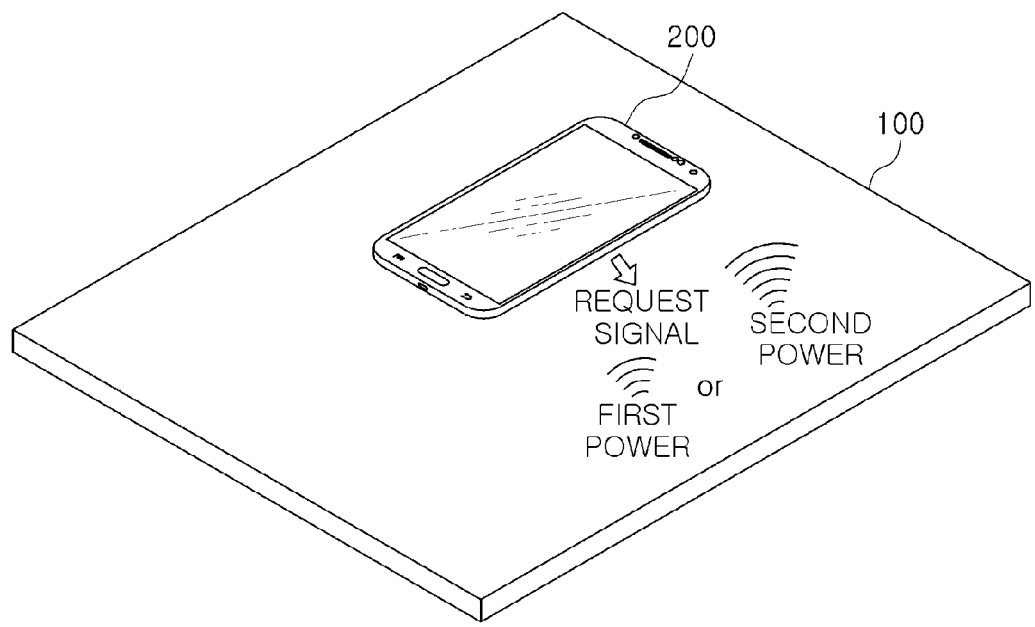
FIG. 1 is a schematic configuration diagram of a non-contact type power transceiving apparatus according to an exemplary embodiment in the present disclosure.

FIG. 1 is a schematic configuration diagram of a non-contact type power transceiving apparatus according to an exemplary embodiment in the present disclosure.

Referring to FIG. 1, a non-contact type power transceiving apparatus according to an exemplary embodiment in the present disclosure may include a non-contact type power transmitting apparatus 100 and a non-contact type power receiving apparatus 200.

The non-contact type power receiving apparatus 200 may transmit a request signal for requesting power to the non-contact type power transmitting apparatus 100, and the non-contact type power transmitting apparatus 100 may transmit a first power or a second power capable of rapidly charging the non-contact type power receiving apparatus 200 due to having a power level higher than that of the first power to the non-contact type power receiving apparatus 200 in a non-contact scheme, based on the transmitted request signal.

As used herein, the non-contact scheme may refer to a scheme in which power is transmitted without a direct connection between conductors of a power transmitting side and a power receiving side during a process in which power is transmitted from the power transmitting side to the power receiving side, that is, a contactless scheme, a wireless transmitting scheme, or the like.

Figure 2:
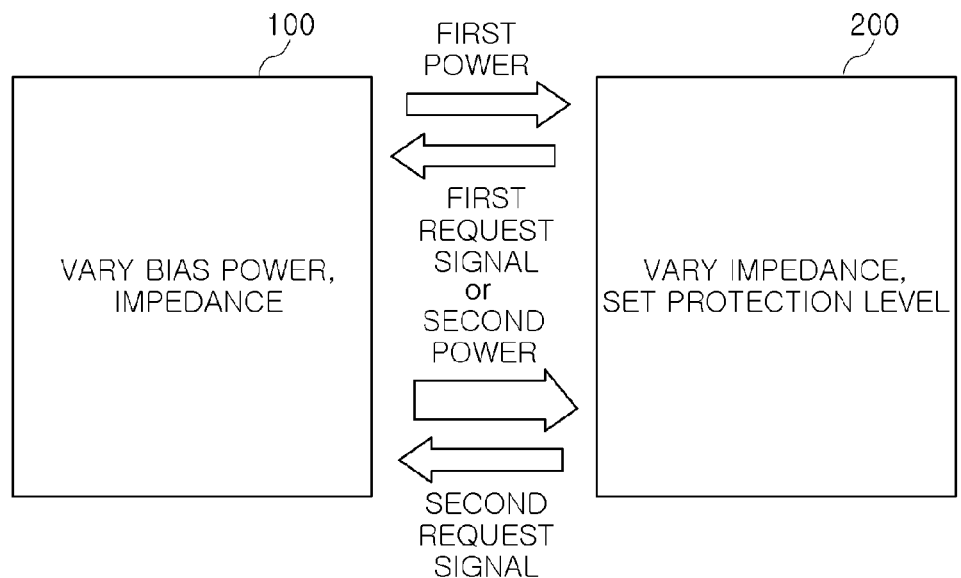
FIG. 2 is a schematic block diagram of a non-contact type power transceiving apparatus according to an exemplary embodiment in the present disclosure.

FIG. 2 is a schematic block diagram of a non-contact type power transceiving apparatus according to an exemplary embodiment in the present disclosure.

Referring to FIG. 2, the non-contact type power transmitting apparatus 100 may vary a level of bias power for supplying transmission power in order to transmit a first power or a second power to the non-contact type power receiving apparatus 200 in a non-contact scheme based on a transmitted request signal, and may adjust power transmitting impedance matching of an output terminal to correspond to the transmission power in order to increase transmission efficiency based on the varied transmission power level.

Further, the non-contact type power receiving apparatus 200 may adjust power receiving impedance matching so as to be suitable for the reception of the requested power in order to receive the first or second power by a first or second request signal.

In addition, since the second power has a power level higher than that of the first power, the non-contact type power receiving apparatus 200 may vary a set protection level for determining an abnormal state, as a provision against an increase in temperature which occurs during a process of receiving the second power.

Figure 3:
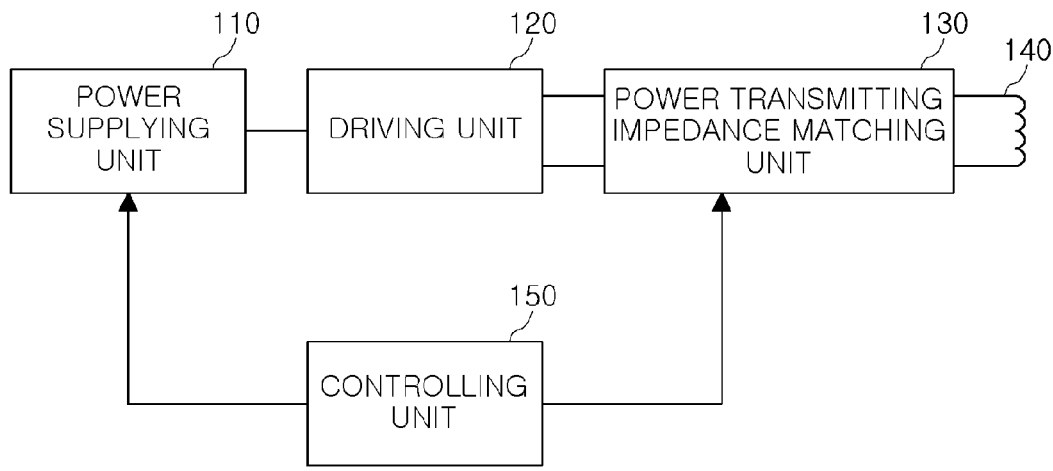
FIGS. 3 and 4 are schematic block diagrams of a non-contact type power transmitting apparatus according to exemplary embodiments in the present disclosure.
Figure 4:
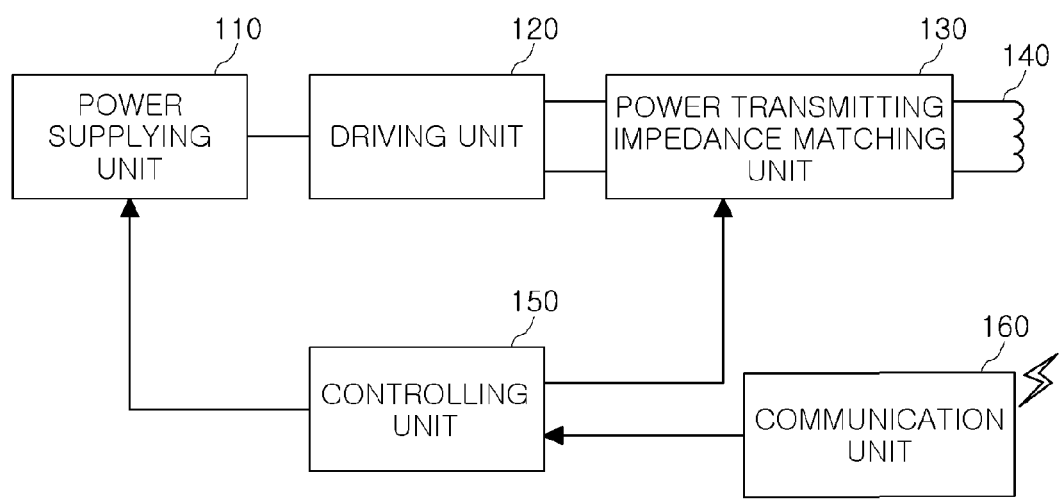

FIGS. 3 and 4 are schematic block diagrams of a non-contact type power transmitting apparatus according to exemplary embodiments in the present disclosure.

Referring to FIG. 3, the non-contact type power transmitting apparatus 100 according to an exemplary embodiment in the present disclosure may include a power supplying unit 110, a driving unit 120, a power transmission matching unit 130, a power transmitting coil 140, and a controlling unit 150.

The power supplying unit 110 may supply bias power to the driving unit 120. A level of the bias power supplied to the driving unit 120 may be varied by a control of the controlling unit 150.

The driving unit 120 may transmit a first power or a second power based on the level of the bias power from the power supplying unit 110.

The power transmitting impedance matching unit 130 may adjust impedance matching by varying impedance in a transfer path based on the power from the driving unit 120.

The power transmitting coil 140 may externally transmit the first power or the second power which is transferred to an impedance matched path in the non-contact scheme.

The controlling unit 150 may control the first power or the second power to be transmitted by varying the level of the bias power of the power supplying unit 110 based on the request signal from the non-contact type power receiving apparatus 200. In addition, the controlling unit 150 may vary impedance to adjust impedance matching of the transfer path of the power transmission impedance matching unit 130 in order to increase power transfer efficiency of the requested first or second power.

The controlling unit 150 may detect an impedance variation reflected in the power transmitting coil 140 based on operation controlling by the non-contact type power receiving apparatus 200, and may receive the request signal from the non-contact type power receiving apparatus 200.

Referring to FIG. 4, the non-contact type power transmitting apparatus 100 according to an exemplary embodiment in the present disclosure may further include a communication unit 160.

The communication unit 160 may receive the request signal from the non-contact type power receiving apparatus 200, and may transfer the request signal to the controlling unit 150.

The communication unit 160 may receive the request signal from the non-contact type power receiving apparatus 200 by using at least one of various communications schemes such as Bluetooth, ZigBee, wireless fidelity (Wi-Fi), near field communication (NFC), and the like.

Since functions and operations of the power supplying unit 110, the driving unit 120, the power transmitting impedance matching unit 130, the power transmitting coil 140, and the controlling unit 150 are the same as or similar to those described in FIG. 3, a detailed description thereof will be omitted.

Figure 5:
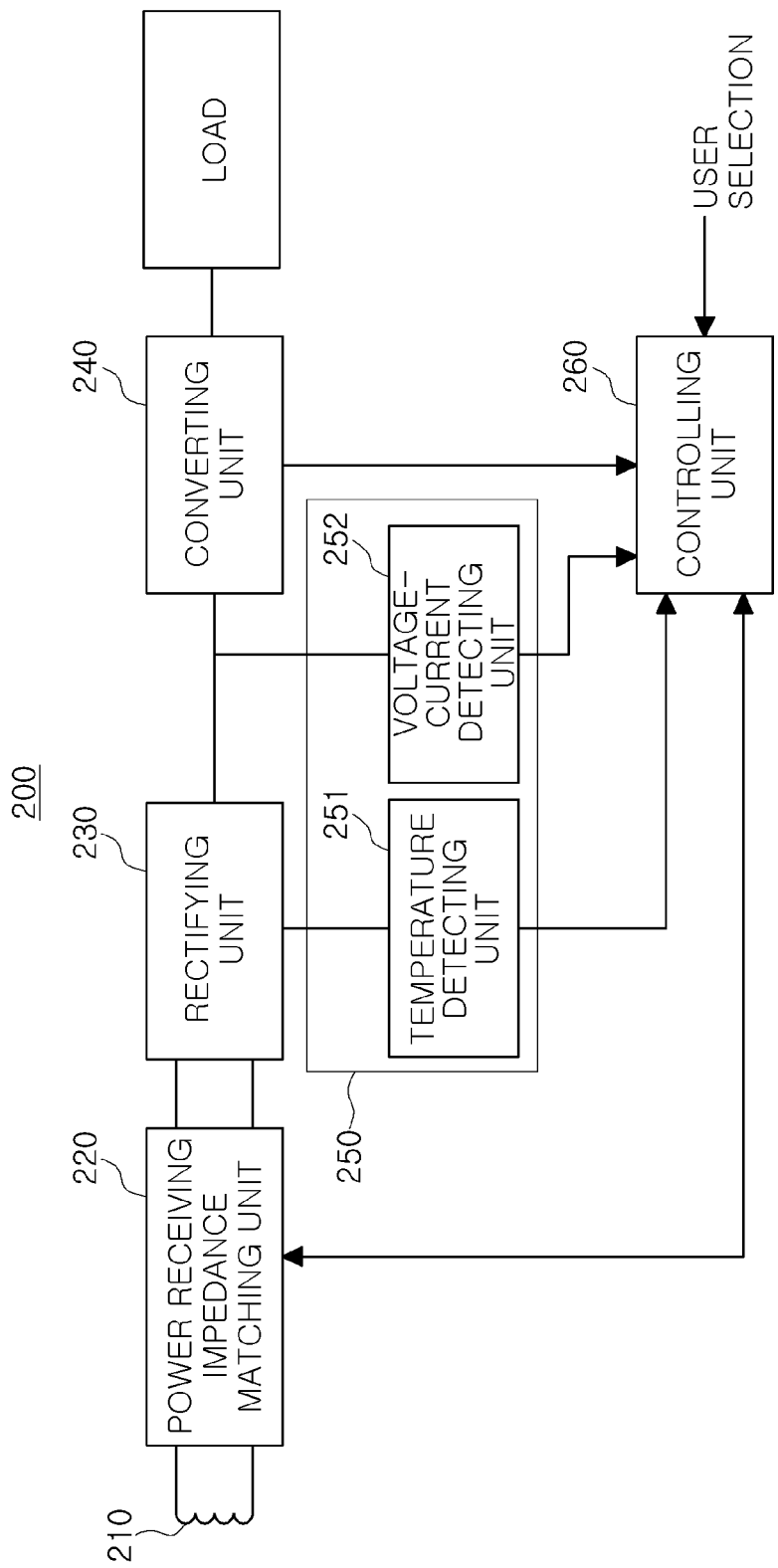
FIGS. 5 and 6 are schematic block diagrams of a non-contact type power receiving apparatus according to exemplary embodiments in the present disclosure.
Figure 6:
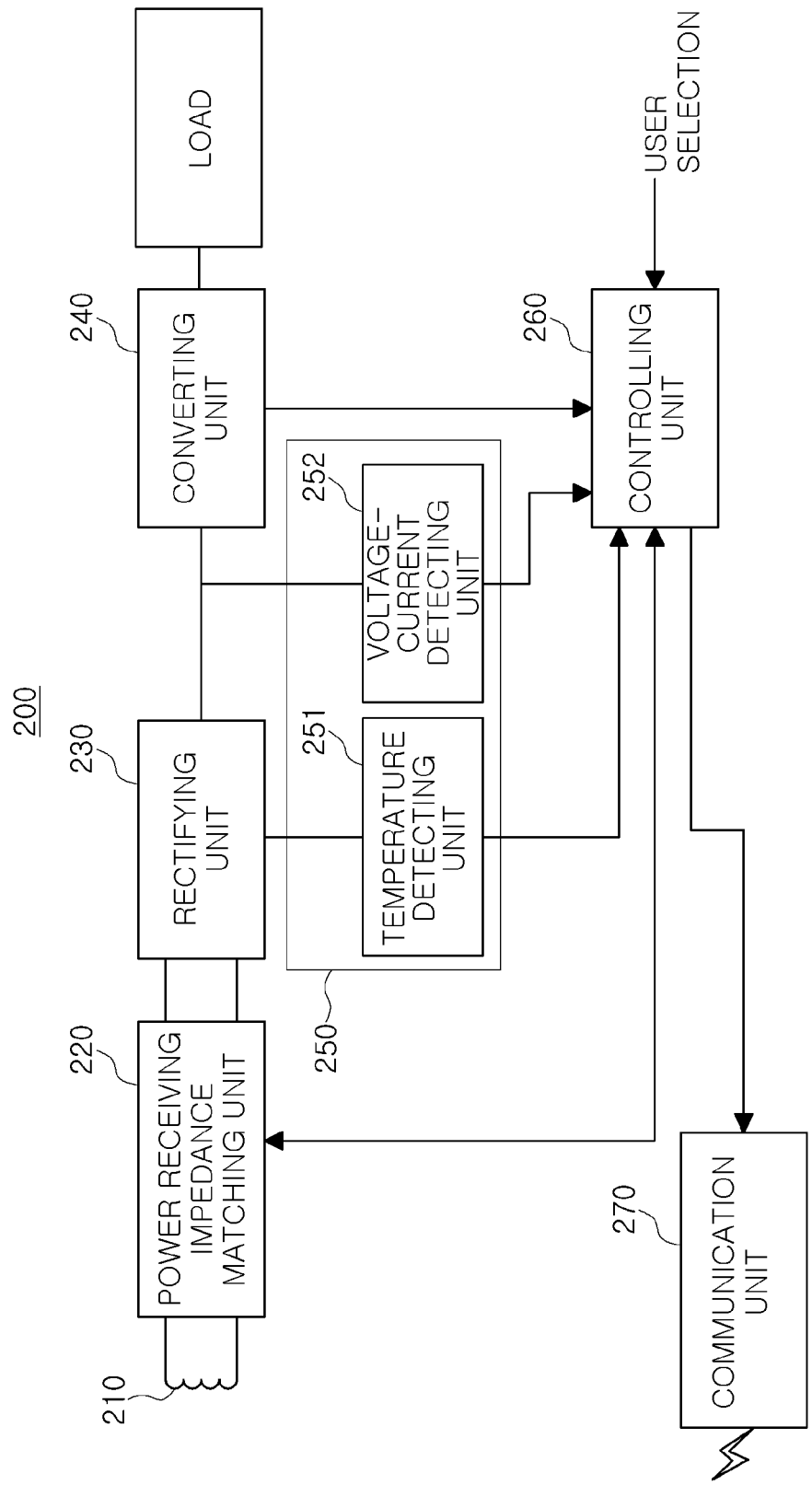

FIGS. 5 and 6 are schematic block diagrams of a non-contact type power receiving apparatus according to exemplary embodiments in the present disclosure.

Referring to FIG. 5, the non-contact type power receiving apparatus 200 according to an exemplary embodiment in the present disclosure may include a power receiving coil 210, a power receiving impedance matching unit 220, a rectifying unit 230, a converting unit 240, a detecting unit 250, and a controlling unit 260.

The power receiving coil 210 may receive power from the non-contact type power transmitting apparatus 100, and the power receiving impedance matching unit 220 may vary impedance to adjust impedance matching of a suitable transfer path based on whether or not the power received based on controlling by the controlling unit 260 is the first power or the second power.

The rectifying unit 230 may rectify the received power, and the converting unit 240 may convert the rectified power into charging power and may transfer the charging power to a load.

The detecting unit 250 may detect physical characteristics occurring at the time of the power reception, and may include a temperature detecting unit 251 and a voltage-current detecting unit 252.

The temperature detecting unit 251 may detect heat occurring at the time of the power reception and may transfer the heat to the controlling unit 260, and the voltage-current detecting unit 252 may detect a voltage or a current of the received power and may transfer the voltage or the current to the controlling unit 260.

The controlling unit 260 may determine an abnormal state based on a set protection level, wherein the controlling unit 260 may stop a power receiving operation by comparing a temperature level detected from the temperature detecting unit 251 with a set temperature level to determine the abnormal state, and may request a level adjustment of the transmission power based on a level of the voltage or current detected from the voltage-current detecting unit 252.

Meanwhile, the controlling unit 260 may request that the non-contact type power transmitting apparatus 100 transmit the first power or the second power, may vary impedance to adjust impedance matching to be suitable for the requested power, and may vary the set temperature level. For example, in a case in which the controlling unit 260 requests the second power having a level higher than that of the first power, since a greater amount of heat may be generated at the time of the power reception, the controlling unit 260 may allow a normal operation to be performed even in the case in which the second power is received, by varying the set temperature level which is set to be suitable for the first power.

Further, the controlling unit 260 may determine the abnormal state based on the level of the voltage or current detected from the voltage-current detecting unit, and may stop the power receiving operation. That is, for example, in the case in which the controlling unit 260 requests the second power having the level higher than that of the first power, in the case in which the first power is received, the controlling unit 260 may allow the normal operation to be performed even in the case in which the second power is received, by varying a set voltage level or a set current level which is set for an over voltage protection (OVP) or an over current protection (OCP).

The controlling unit 260 may transmit a request signal by adjusting an operation state of at least one of the rectifying unit 230 and the converting unit 240 thereby to vary impedance of the power transmitting coil 140 of the non-contact type power transmitting apparatus 100.

Referring to FIG. 6, the non-contact type power receiving apparatus 200 according to an exemplary embodiment in the present disclosure may further include a communication unit 270.

The communication unit 270 may transmit the request signal of the controlling unit 260 based on a user selection to the non-contact type power transmitting apparatus 100.

The communication unit 270 may transmit the request signal to the non-contact type power transmitting apparatus 100 by using at least one of various communications schemes such as Bluetooth, ZigBee, Wi-Fi, NFC, and the like.

Since functions and operations of the power receiving coil 210, the power receiving impedance matching unit 220, the rectifying unit 230, the converting unit 240, the detecting unit 250, and the controlling unit 250 are the same as or similar to those described in FIG. 3, a detailed description thereof will be omitted.

Figure 7:
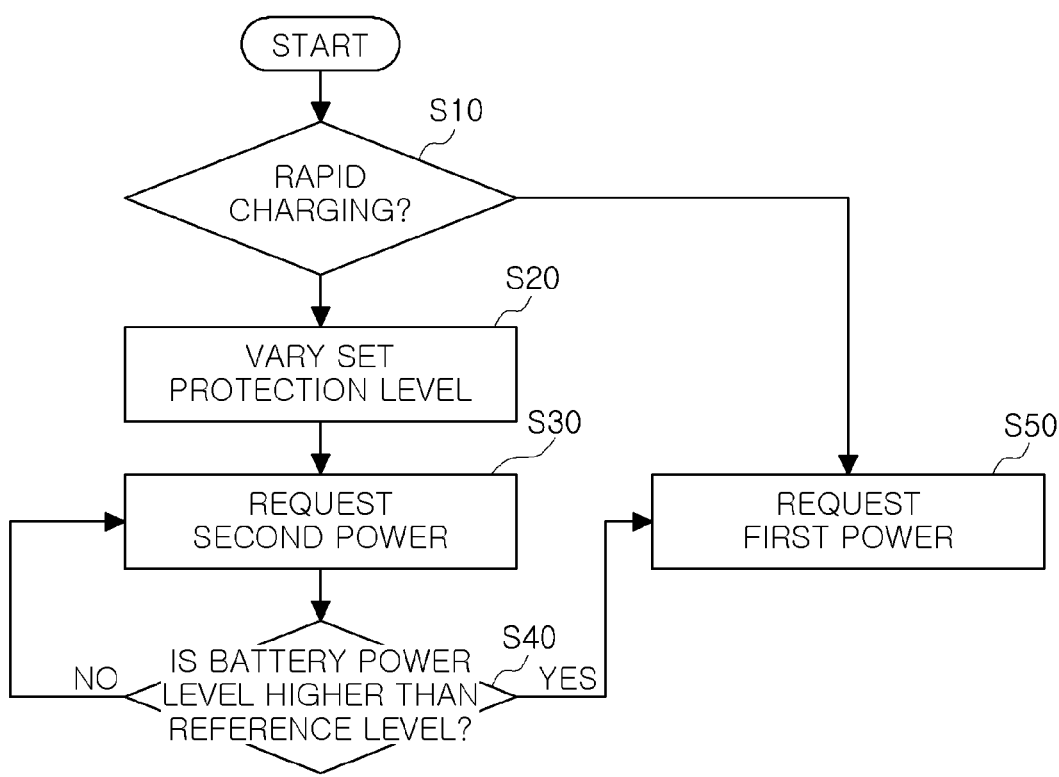
FIG. 7 is a schematic operation flowchart of a non-contact type power transceiving apparatus according to an exemplary embodiment in the present disclosure.

FIG. 7 is a schematic operation flowchart of a non-contact type power transceiving apparatus according to an exemplary embodiment in the present disclosure.

In a case in which a user selects rapid charging in operation S10, the controlling unit 260 of the non-contact type power receiving apparatus 200 may vary a set protection level in operation S20, and may request that the non-contact type power transmitting apparatus 100 transmit a second power in operation S30. The set protection level may be a set temperature level, a set power level, or a level associated with power receiving impedance matching, and may vary all of the set temperature level, the set power level, and the level associated with the power receiving impedance matching.

In response to the transmission request for the second power from the non-contact type power receiving apparatus 200, the non-contact type power transmitting apparatus 100 may transmit the second power to the non-contact type power receiving apparatus 200 in the non-contact scheme by varying bias power and varying impedance to adjust impedance matching in a transmission power transfer path.

Meanwhile, the controlling unit 260 of the non-contact type power receiving apparatus 200 may request the transmission of a first power by decreasing a power level in a case in which a level of power charged in a load, that is, a battery is higher than a reference level in operation S40, and may request the transmission of the first power in a case in which the rapid charging is not required in operation S50.

Consequently, the controlling unit 260 of the non-contact type power receiving apparatus 200 may vary the set temperature level and the power receiving impedance matching so as to be suitable for the reception of the first power, and may request the transmission of the first power. The non-contact type power transmitting apparatus 100 may vary the bias power to be suitable for the requested first power, may vary the impedance of the transmission power transfer path, and thereby transmit the first power to the non-contact type power receiving apparatus 200 in the non-contact scheme.

As described above, according to the present disclosure, the rapid charging may be supplied to mobile devices such as smartphones, tablet personal computers (PCs), convertible laptop PCs, and the like, as necessary.

As set forth above, according to exemplary embodiments in the present disclosure, the rapid charging may be achieved.

While exemplary embodiments have been shown and described above, it will be apparent to those skilled in the art that modifications and variations could be made without departing from the scope of the present invention as defined by the appended claims.

What is claimed is:

1. A non-contact type power receiving apparatus, comprising:
    a rectifying unit rectifying received power;
    a converting unit converting the rectified power into charging power and transferring the charging power to a load;
    a detecting unit detecting physical characteristics occurring at the time of power reception; and
    a controlling unit requesting a first power or a second power having a power level higher than that of the first power based on a user selection and varying a set level determining an abnormal state based on the requested power.

2. The non-contact type power receiving apparatus of claim 1, wherein the controlling unit varies a set temperature level based on the requested power.

3. The non-contact type power receiving apparatus of claim 1, further comprising a power receiving impedance matching unit varying power receiving impedance based on a power request from the controlling unit.

4. The non-contact type power receiving apparatus of claim 1, wherein the controlling unit controls an operation of at least one of the rectifying unit and the converting unit and varies impedance detected from a power transmitting side to request necessary power.

5. The non-contact type power receiving apparatus of claim 1, further comprising a communication unit transferring a power request from the controlling unit based on a user selection to a power transmitting side.

* * * * *